United States Patent [19]

Cheysson et al.

[11] Patent Number: 4,830,464
[45] Date of Patent: May 16, 1989

[54] WIDE FIELD HIGH OPTICAL EFFICIENCY DISPLAY DEVICE

[75] Inventors: Francoise Cheysson, Montrouge; Jean B. Migozzi, Orsay, both of France

[73] Assignee: Thomson CSF, Paris, France

[21] Appl. No.: 10,339

[22] Filed: Feb. 3, 1987

[30] Foreign Application Priority Data

Feb. 4, 1986 [FR] France ................... 86 01523

[51] Int. Cl.⁴ ................... G02B 27/14; G02B 5/32
[52] U.S. Cl. ................... 350/174; 350/3.7
[58] Field of Search ................... 350/3.7, 174

[56] References Cited

U.S. PATENT DOCUMENTS

| | | | |
|---|---|---|---|
| 3,940,204 | 2/1976 | Withrington | 350/174 |
| 4,407,564 | 10/1983 | Ellis | 350/174 |
| 4,563,061 | 1/1986 | Ellis | 350/174 |
| 4,600,271 | 7/1986 | Boyer et al. | 350/174 |

FOREIGN PATENT DOCUMENTS

| | | |
|---|---|---|
| 0005245 | 11/1979 | European Pat. Off. . |
| 0009332 | 4/1980 | European Pat. Off. . |
| 0077193 | 4/1983 | European Pat. Off. . |

OTHER PUBLICATIONS

"The Latirn Wide Field-of-View Raster Head-up Display", p. 5, Colonne de Droite Ligne 47-p. 6, Collonne de Gauche, Ligne 25; Figure 7.
"Wide Field of View Head-up Displays", Figures 7, 8b.

Primary Examiner—John K. Corbin
Assistant Examiner—Jay Patrick Ryan
Attorney, Agent, or Firm—Cushman, Darby & Cushman

[57] ABSTRACT

A display device with wide field and high optical efficiency is provided including an optical assembly having a spherical holographic mirror used on the axis and a semitransparent mirror. A generator of light images emits a radiation which strikes first of all the convex phase of the spherical mirror, passes through it, and is then reflected by the semitransparent mirror in the direction of the spherical mirror, which reflects it and finally sends it towards the observer. This optical collimation and combination assembly is included in a transparent medium formed by a glass plate with parallel faces and forming a stigmatic optical system at infinity, required for the correct reception of the radiation coming from the outside landscape.

16 Claims, 2 Drawing Sheets

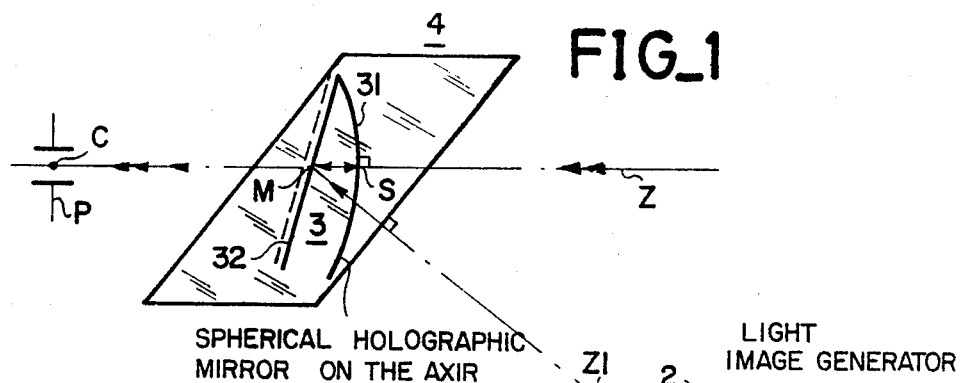
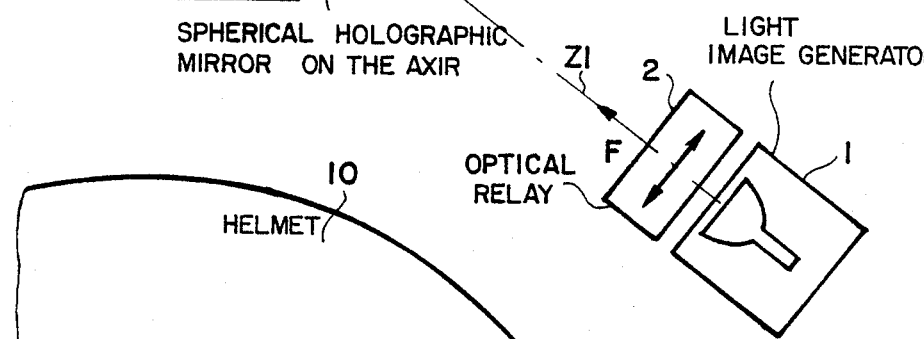
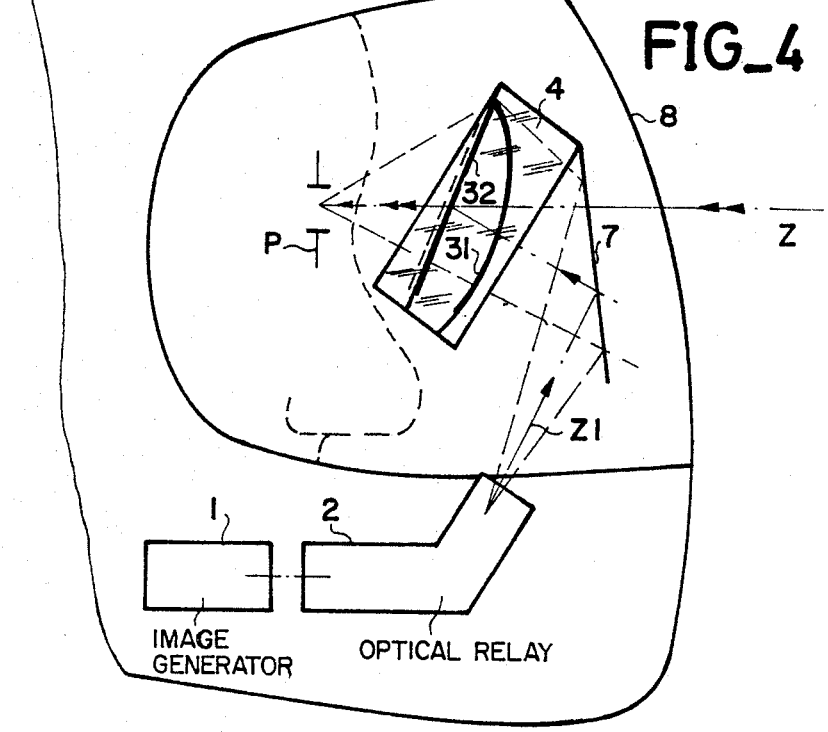

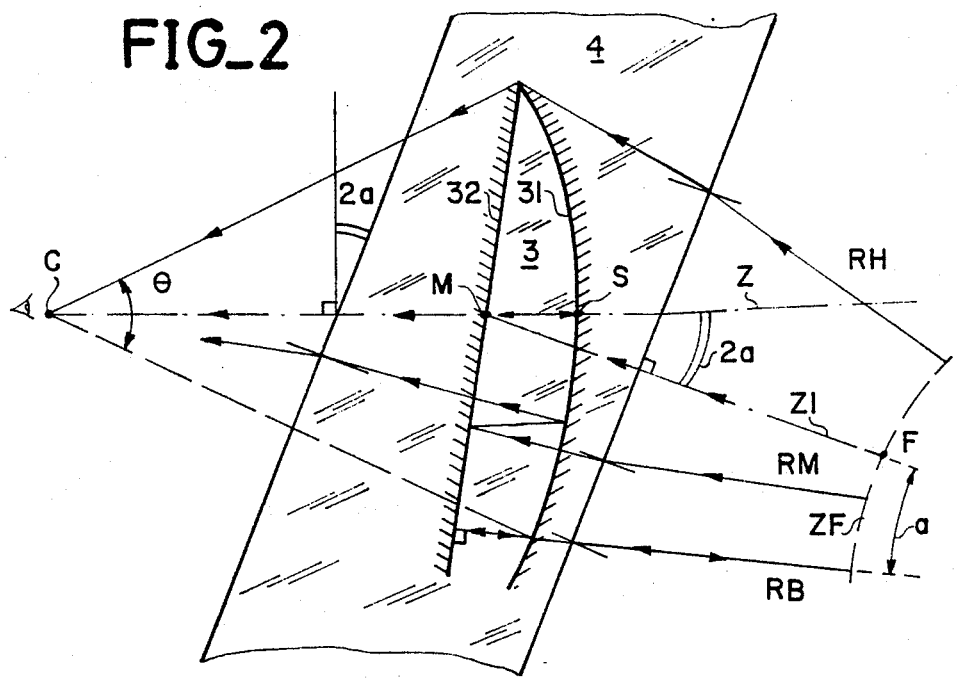
FIG_2
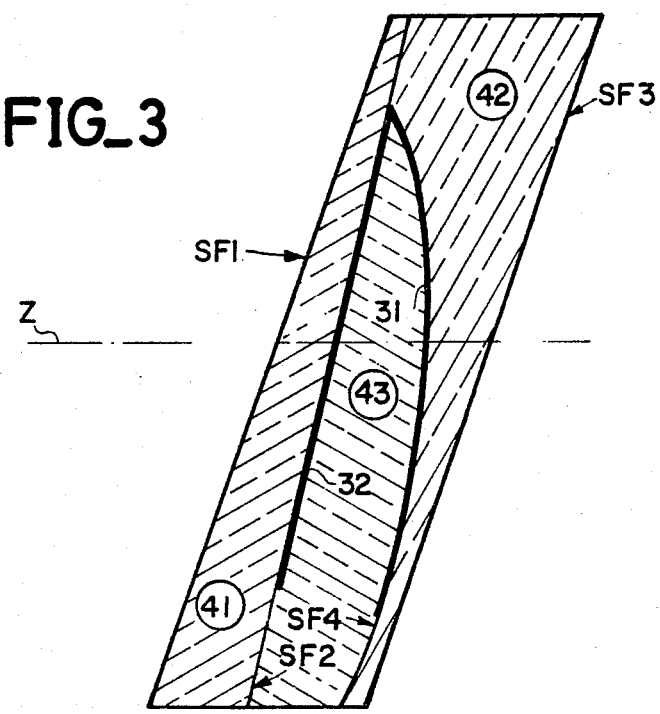
FIG_3

WIDE FIELD HIGH OPTICAL EFFICIENCY DISPLAY DEVICE

BACKGROUND OF THE INVENTION

1. Field of the Invention

The present invention relates to a wide field high optical efficiency display device, in which a collimated light image is observed superimposed on the vision of the external landscape. The collimating optics reflect to infinity the light image corresponding to the data to be collimated; this results in an absence of effort of accomodation for the eye of the observer and great visual comfort. In the conventional head-up display on board aircraft, the light image is reflected by a combination optical system to the observer. This optical system is traversed by the radiation coming from the external landscape. Thus, the observer sees the collimated light image corresponding, for example, to a synthetic image which conveys air navigation data superimposed on the landscape.

Recent techniques in this field of head-up collimators have been directed essentially towards increasing the instantaneous field of vision of the collimated image, as well as towards obtaining an improved optical efficiency.

2. Description of the Prior Art

One known solution consists in using a spherical mirror on the axis which also limits the optical aberrations. A solution of this kind is described in the French patent application No. 2,542,459; in this embodiment, the optical axis of the spherical mirror corresponds to the normal axis of vision of the observer whose eye is placed at the center of the mirror. This latter is combined with a semitransparent flat mirror whose purpose is to reflect the optical axis of the light image generator to the spherical mirror on the concave side which produces the collimation and sends back the collimated image towards the observer. To increase the efficiency, a holographic spherical mirror is used which reflects the wave length corresponding to the image generator formed generally by the screen of a cathode ray tube. The main drawback of this solution is that the field, although enlarged, remains however limited to values of the order of 30° to 40°. For a greater increase of the field it would be necessary to use the spherical mirror out of the axis for the partially transparent flat mirror would be too close to the eye of the observer. The result would more especially be optical aberrations and difficulties of implementation.

In another solution, mentioned in Optical Engineering September/October 1985/Vol. 24-No. 5/pages 769–780-article entitled "Holographic Mirrors", a first flat semitransparent mirror is used for reflecting the axis of the light image generator to the eye of the observer. The corresponding radiation reflected by this mirror passes through the spherical mirror, which is followed by a second semitransparent mirror perpendicular to the optical axis of the spherical mirror corresponding to the normal direction of vision. The use of this second flat semitransparent mirror is made necessary because of the presence of polarizers for polarizing the radiation of the light image and for then recovering it after collimation by means of the spherical mirror. Thus a selection of the path of the landscape and that of the image formation is obtained as a function of their polarization (so called "pancake" system). This solution increases the field but does not perform at all well from the photometric point of view and raises problems for use in the real situation. In fact, the transmission over the optical path of observation of the landscape is limited to 6.2% and that over the optical path of observation of the synthetic image is limited to 1.6%. This results in losses introduced at the mirrors during multiple reflections and transmissions and by passing through polarizers. It is not possible to use a hologram, since the system is completely along the axis the paths are not separable by holography.

SUMMARY OF THE INVENTION

The purpose of the invention is to provide a display device with an even wider field and great energy efficiency while forming an ergonomic system. By way of indication, the solution proposed in what follows allows a field of the order of 50% to be obtained in elevation over about 80° in horizontal deflection, and efficiencies up to 25% for the image path and 45% for the landscape path.

Another object of the invention is the use of the display device of the invention for forming a helmet sighting device.

The above aim is attained by providing a collimator including a collimation and combination assembly comprising a spherical holographic mirror used on the axis for observing a collimated light image from the center of this mirror and a semitransparent mirror inclined with respect to said axis corresponding to the normal direction of vision, for observing the collimated image superposed on the external landscape, and a generator of the light image to be collimated whose radiation reaches the semitransparent mirror, which reflects it to the spherical mirror on the concave side, this latter again reflecting it towards the semitransparent mirror which transmits it in the direction of the observer. The radiation of the light image passes first of all through the spherical mirror on which it strikes the convex side, with an incidence outside the range of incidence for which the mirror is designed selective on reflection, said radiation passing through the spherical mirror in the direction of the semitransparent mirror, said optical assembly being disposed in a transparent medium forming a plate with parallel faces which forms a stigmatic system for infinity.

BRIEF DESCRIPTION OF THE DRAWINGS

The features and advantages of the invention will appear from the following description given by way of example with reference to the accompanying Figures which show:

FIG. 1: a general diagram of a display device in accordance with the invention;

FIG. 2: a partial diagram representing the progress of the rays of the image path and of the characteristic angles for determining the hologram of the spherical mirror;

FIG. 3: another representation of the optical assembly showing one embodiment;

FIG. 4: a diagram relative to an application to a helmet sighting device.

DESCRIPTION OF THE PREFERRED EMBODIMENT

Referring to FIG. 1, the display device comprises an image forming assembly or image generator formed from a cathode ray tube 1, or any other equivalent device, for example a liquid crystal matrix. So as to cause the light image formed on the screen of tube 1 to coincide well with the focal surface of the spherical mirror, the image former 1 is very often associated with an optical relay system 2. The optical collimation and combination assembly is formed by the spherical mirror 31 and the partially transparent mirror 32. This assembly is disposed inside a plate with parallel faces 4. The axis Z1 represents the optical axis from the image generator 1 which corresponds on the tube to the center of the light image. The axis Z corresponds to the optical axis of the spherical mirror 31 and also corresponds to the normal direction of vision for an observer placed at C in the center of the spherical mirror 31. This observer has been shown by the observation pupil P. The optical path SC corresponds to the ray R from the spherical mirror. The path SM+MF corresponds to the focal distance of the spherical mirror, that is to say to R/2.

The use of the spherical mirror 31 on the axis limits the aberrations while considerably increasing the field. The energy efficiency is increased by making a holographic selection of the two paths mirror 31 comprises for this purpose a holographic mirror which selects according to both the wave length and the angle of incidence of the rays coming from the image generator 1. The semitransparent mirror 32 provides an angular separation of the rays of the image before and after reflection from the holographic mirror. Thus the angular selectivity of the hologram may be used on the image path. The plate with parallel faces 4 is slanted with respect to the axis Z. This in no wise modifies the infinite-infinite combination indispensable for the whole visible spectrum coming from the landscape.

FIG. 2 shows more precisely the operation of the device and certain constructional features. The angle $\theta$ represents the instantaneous field of vision in elevation of the collimated light image. The angle "a" represents substantially the limit value of the lowest possible ray RB with respect to the axis Z1 of the image generator. In fact, after refraction in plate 4 the ray RB strikes the flat mirror 32 with a normal incidence and is thus reflected back in its original direction to return to the image generator 1. This defines the lower observation limit for the field angle $\theta$. The slant of the parallel faces of plate 4 with respect to axis Z is chosen preferably equal to the value "2a", which corresponds to the angular value between the optical axes Z and Z1. Thus, the axis Z1 has a normal incidence on a lateral face of plate 4 and undergoes no angular deflection during passage through this plate. It ends at the meeting point M of directions Z and Z1; mirror 32 reflects the radiation coming from direction Z1 along direction Z and, after covering the distance MS, this radiation of initial directions Z1 is reflected back by the spherical mirror towards the center C where it arrives after passing through the semitransparent mirror 32 and the output face of plate 4.

The optical paths are also shown for the top ray RH which arrives at the top of the assembly 31, 32 and is bent back by the assembly also in the direction of the eye at C, and for any ray RM following the general path between the elements of the collimating and combining optical assembly 31, 32. To simplify the Figure, the refraction due to plate 4 has not been taken into account at the output except for the ray RM. It should also be noted that the diagram is not to scale; the distance CS corresponds to the radius R of the spherical mirror 31 and the distance SM+MF corresponds to the focal distance and is equal to half R/2 of the radius of the sphere 31. The spherical focal zone ZF is obtained generally by means of a relay optical system 2 which modifies and curvature of the cathode screen, or of the element matrix, used for forming the image generator 1.

The hologram formed on the spherical diopter 31 is such that from the spectral point of view it is efficient for the light rays of a band corresponding to those of the image former. This band may more particularly be situated in the green and corresponds to a narrow spectral band of the visible spectrum. The second condition which the hologram satisfies is that of the range of angle of incidence required for obtaining the desired observation field $\theta$. The limit incidence values presented by the endmost rays RH and RB when they arrive on the convex side of the spherical mirror 31 define a first incidence range for which the mirror 31 must be passing. To these values there corresponds, after reflection on the flat semitransparent mirror 32, a second range of incidences presented by the radiation from the image former when it reaches the convave side of the spherical mirror 31. For this second range the hologram is defined selective and reflecting, which means that said ranges are distinct. The hologram is not selective on reflection for the radiation which is situated outside this second range, or which is situated outside the selected spectral band. Thus, the radiation from the landscape will substantially all pass through the mirror 31, except only for the radiation included in the selected spectral band and which has an incidence value included in the range of incidences selected for reflection.

From the loss point of view, the losses should be essentially considered at the level of the partially transparent mirror 32 when the image radiation with axis Z1 is reflected first of all by the mirror, then passes through it after being reflected from the mirror 31; furthermore the radiation from the landscape also passes through this mirror and is partially eliminated by reflection. It may however be considered that the system has a very good energy efficiency since it allows up to 25% of energy transmission to be obtained in the image path and of the order of 45% in the landscape path.

FIG. 3 shows one embodiment of plate 4 in which is included the collimater-combiner assembly 31, 32. This device is in fact formed of three pieces of glass which fit into each other, a first piece 41 of which a flat face SF1 forms a lateral face of plate 4 and whose other flat face SF2 will receive a deposit corresponding to the flat mirror 32 over a zone of an extent required for forming this mirror so as to obtain the desired elevational and horizontal deflection observation field. A second piece 42 also has a flat face SF3 which corresponds to the second lateral face of plate 4 and another face SF4 machined so as to be partially concave. The remaining flat part of this face SF4 bears on the corresponding flat part of face SF2 of piece 41. The third piece 43 includes a flat face and a convex face and fills the space between pieces 41 and 42. The convex face receives the deposit which forms the spherical holographic mirror 31. The assembly 4 of pieces 41, 42 and 43 are made from the same transparent material preferably formed from glass. It should be noted that the deposit corresponding to mirror 32 may be made on the central element 43.

FIG. 4 relates to an application to a helmet sighting device, or to any use of the collimator kind requiring the image generator to be disposed on the same side as the eye with respect to the optical assembly 4. For this purpose, the radiation of axis Z1 is reflected back to the assembly 4 by means of an additional mirror 7. The change of direction mirror 7 may be a semireflecting mirror or advantageously in the form of a holographic optical system responding to the wave length of the image former 1 and to the incidence of the radiation from the image former arriving on this element. Thus, the radiation from the external landscape passing through the eye piece 8 at the position of mirror 7 is not disturbed except that corresponding to the selection criteria (wave length and angle of incidence) of the hologram. A device may also be provided for retracting plate 4 from the visual field during the periods when the collimating device is not used by the pilot.

What is claimed is:

1. A display device, comprising:
   generator means for producing radiation along a first optical axis, said radiation indicative of a light image to be collimated;
   an optical collimation and combination assembly comprising:
   (a) a spherical holographic mirror, having an axis defined by a radius of curvature thereof, said spherical mirror disposed with said axis corresponding to a direction of normal vision,
   wherein said spherical mirror is used in an on-the-axis configuration and
   (1) is located to directly receive said radiation from said generator means on the convex face thereof and to pass said radiation received from said generator means therethrough, and
   (2) includes a hologram that has a selective reflection function such that it selectively reflects radiation received on the concave face of said spherical mirror which has the spectral band of said radiation from said generator means and has an incidence angle within a predetermined range of incidence angles, including said direction of normal vision, and
   (3) has the concave face which reflects radiation received from a direction parallel to said direction of normal vision in a parallel direction to the direction received; and
   (b) a semitransparent mirror, located adjacent said spherical mirror and slanted with respect to said axis of said spherical mirror,
   (1) receiving said radiation from said generator means passed through said convex face of said spherical mirror,
   (2) reflecting radiation received from a direction substantially parallel to said first optical axid of said generator means toward said concave face of said spherical mirror, and
   (3) passing radiation received from a direction substantially parallel to said direction of vision; and
   a transparent medium for containing said collimation and combination assembly, in the form of a plate having parallel faces, both of which form an angle with said axis of said spherical mirror.

2. The device as claimed in claim 1, wherein said plate is arranged such that the parallel faces are slanted with respect to said normal direction of vision and are normal to the direction of said first optical axis.

3. The device as claimed in claim 1, wherein said generator means includes a cathode ray tube and an optical relay system.

4. The device as claimed in claim 1, wherein said generator means is formed by a liquid crystal matrix.

5. The device as claimed in claim 1, wherein said generator means and the observer are disposed on opposite sides of said collimation assembly, respectively.

6. The device as claimed in claim 1, wherein said generator means and the observer are disposed on the same side of said collimator assembly, said device further comprising a change of direction mirror for reflecting radiation of the generator means and its optical axis towards a convex face of the spherical mirror.

7. The device as claimed in claim 6, wherein said change of the direction mirror is holographic for selecting for reflection the radiation of the generator means.

8. The device as claimed in claim 6 used for forming a helmet sighting device, said change of direction mirror being mounted on the eyepiece of the helmet and allowing the visible radiation coming from the external landscape to pass.

9. A display device comprising:
   an optical collimation and combination assembly having a spherical holographic mirror, used on the axis for allowing observation of a collimated light image from the center of this mirror, said spherical mirror having a first optical axis, corresponding to a normal direction of vision, and a semitransparent mirror slanted with respect to said first axis for observing the collimated image superimposed on an external landscape;
   a generator of a light image to be collimated having a second optical axis, said generator producing radiation which first reaches the convex side of the spherical mirror having an incidence angle outside a range of incidence angles for which the mirror is designed selective on reflection,
   said collimation and combination assembly arranged such that (a) said radiation from said generator passes through the spherical mirror toward the semitransparent mirror, which reflects it towards the concave side of the spherical mirror which reflects it to the semitransparent mirror which it passes through in the direction of the observer, (b) radiation from the image generator having the direction of said second optical is reflected by the semi-transparent mirror after passing through the spherical mirror parallel to said direction of normal vision, then is reflected by the spherical mirror used on-the-axis in the same direction, said spherical mirror including a hologram defined to selectively reflect the spectral band of the image generator and further for the range of angles of incidence of said radiation striking said concave face; and
   a transparent medium, in which said optical assembly is located forming a plate with parallel faces which is a stigmatic system for infinity.

10. The device of claim 9 wherein said plate is arranged such that its parallel faces are slanted with respect to a normal direction of vision and are normal to said second optical axis of said generator means.

11. The device as in claim 9 wherein said generator means includes a cathode ray tube and an optical relay system.

12. The device as in claim 9 wherein said generator means is formed by a liquid crystal matrix.

13. The device as in claim 9 wherein said generator means and an observer are disposed on opposite sides of said collimation and combination assembly, respectively.

14. The device as in claim 9 wherein said generator means and an observer are disposed on the same side of said collimation and combination assembly, said device further comprising a change of direction mirror for reflecting radiation of the generator means and its optical axis towards a convex face of said spherical mirror.

15. The device as in claim 14 wherein said change of direction mirror is holographic for selecting the reflection of radiation of said generator means.

16. The device as in claim 14 used for forming a helmet sighting device, said change of direction mirror being mounted on the eye piece of the helmet and allowing the visible radiation from the external landscape to pass therethrough.

* * * * *